(12) United States Patent
Hong et al.

(10) Patent No.: US 12,470,319 B2
(45) Date of Patent: Nov. 11, 2025

(54) LOW LATENCY RETIMER AND LOW LATENCY CONTROL METHOD

(71) Applicant: Montage Electronics (Shanghai) Co., Ltd., Shanghai (CN)

(72) Inventors: Yu Hong, Shanghai (CN); Shan Wang, Shanghai (CN); Ranran Fan, Shanghai (CN); Dan Wang, Shanghai (CN); Zhongyuan Chang, Shanghai (CN)

(73) Assignee: Montage Electronics (Shanghai) Co., Ltd., Shanghai (CN)

( * ) Notice: Subject to any disclaimer, the term of this patent is extended or adjusted under 35 U.S.C. 154(b) by 541 days.

(21) Appl. No.: 17/950,140

(22) Filed: Sep. 22, 2022

(65) Prior Publication Data

US 2023/0117385 A1 Apr. 20, 2023

(30) Foreign Application Priority Data

Oct. 20, 2021 (CN) .......................... 202111220992.5

(51) Int. Cl.
*H04L 1/00* (2006.01)
*G06F 13/16* (2006.01)
*G06F 13/42* (2006.01)

(52) U.S. Cl.
CPC .......... *H04L 1/0018* (2013.01); *G06F 13/161* (2013.01); *G06F 13/4291* (2013.01)

(58) Field of Classification Search
CPC .... G06F 13/161; G06F 13/4291; G06F 13/20; G06F 13/385; H04L 1/0018; Y02D 10/00
See application file for complete search history.

(56) References Cited

U.S. PATENT DOCUMENTS

| | | | |
|---|---|---|---|
| 10,979,258 B1* | 4/2021 | Chen | H04L 25/0272 |
| 11,258,696 B1* | 2/2022 | Morrison | H04L 45/121 |
| 11,599,497 B2* | 3/2023 | Wu | H01L 21/768 |
| 2022/0123972 A1* | 4/2022 | Chen | H04L 25/03866 |

* cited by examiner

*Primary Examiner* — Cheikh T Ndiaye
(74) *Attorney, Agent, or Firm* — IPRTOP LLC

(57) ABSTRACT

A low latency retimer and a low latency control method are provided; a physical layer module is provided on each of two opposite sides of the retimer; each physical layer module includes at least one set of signal transceiver units including a signal receiving unit and a signal transmitting unit; the signal receiving unit performs a serial-to-parallel conversion on a first high-speed serial signal to generate a parallel signal, and sends the parallel signal to the signal transmitting unit; the signal transmitting unit performs a parallel-to-serial conversion on the parallel signal, to convert the parallel signal to obtain a second high-speed serial signal, and outputs the second high-speed serial signal. Data paths of the retimer form a loopback structure, and the signal transmitting unit and the signal receiving unit are physically adjacent to each other, which solves the problem of signal transmission delay, and avoids high power consumption.

11 Claims, 6 Drawing Sheets

LOW LATENCY RETIMER AND LOW LATENCY CONTROL METHOD

CROSS REFERENCE TO RELATED APPLICATION

The present application claims the benefit of priority to Chinese Patent Application No. CN 2021112209925, entitled "low latency retimer and low latency control method", filed with CNIPA on Oct. 20, 2021, the disclosure of which is incorporated herein by reference in its entirety for all purposes.

FIELD OF TECHNOLOGY

The present disclosure relates to the field of signal processing, in particular the field of high-speed serial signal conditioning, specifically a low latency retimer and a low latency control method.

BACKGROUND

Retimer is used to recover clocks from received high-speed serial signals, convert the high-speed serial signals into parallel logic signals, and then through internal processing, convert the parallel logic signals into high-speed serial signals using a local clock before sending the high-speed serial signals out. By relaying through a retimer, the transmission distance of high-speed serial signals, which is usually limited, can be multiplied. At the same time, deskewing of signals of different channels through a retimer also alleviates the challenge of trace length matching for long routing signals on the corresponding circuit board.

As shown in FIG. 1, a retimer mainly includes physical layer (PHY) modules on both sides of the retimer, and data path logics and control logics between the PHY modules on both sides. A signal receiving unit (SRU) in the physical layer (PHY) module on one side of the retimer converts the received high-speed serial signal into a lower-speed parallel signal, which is processed by data path logics and transferred to the other side of the retimer, and finally converted into high-speed serial signals and sent out by a corresponding signal transmitting unit (STU) in the physical layer module on the other side. Since the data path logics use a lower speed clock (typically with a frequency less than or equal to 1 GHz) to process and propagate parallel signal, each stage of Flip-Flops in the propagation path of parallel signal introduces a significant part of retimer delay. Also, because of the need to support bifurcation, i.e., splitting a multichannel link into narrower independent sublinks, the retimer needs to implement multiple sets of control logics to support separate control of each independent sublink under different bifurcation configurations. In addition, because of array of Flip-Flops required for clock compensation and deskewing, as well as control logics for coordinating lane equalization on both sides of the links, digital logics occupy a large area in the retimer, thus increasing the distance between the two PHY modules, which in turn further leads to longer latency in signal propagation between the two sides of the retimer.

In order to minimize signal latency of the retimer, after lane equalization negotiation, the retimer can switch data paths from normal paths to straight-through paths optimized for low latency, thus reducing the delay caused by clock compensation, encoding and decoding, scrambling and descrambling, but this still cannot reduce delays caused by serial-to-parallel conversion and signal propagation delays caused by the long distance between the two PHY modules.

SUMMARY

An objective of the present application is to provide a low latency retimer and a low latency control method to effectively reduce the signal delay through retimer.

In one aspect of the present application, a low latency retime is provided, wherein a physical layer module is provided on each of two opposite sides of the retimer; each physical layer module includes at least one set of signal transceiver units, and each set of the transceiver units includes a signal receiving unit, and a signal transmitting unit; the signal receiving unit performs a serial-to-parallel conversion on a first high-speed serial signal to generate a parallel signal, and sends the parallel signal to the signal transmitting unit; the signal transmitting unit performs a parallel-to-serial conversion on the parallel signal, to convert the parallel signal to obtain a second high-speed serial signal, and outputs the second high-speed serial signal.

In one embodiment, the low latency retimer further includes a data selector and a data path logic processing unit corresponding to each set of the signal transceiver units; an output end of the signal receiving unit is connected to a first input end of the data selector and to an input end of the data path logic processing unit, respectively; an output end of the data path logic processing unit is connected to a second input end of the data selector; an output end of the data selector is connected to an input end of the signal transmitting unit. In a low latency mode, the first input end of the data selector is selected and the parallel signal generated by the signal receiving unit is sent to the signal transmitting unit through the data selector; in a normal mode, the second input end of the data selector is selected and the parallel signal generated by the signal receiving unit is processed by the data path logic processing unit and transmitted through the data selector to the signal transmitting unit.

In one embodiment, the low latency retimer further includes a data selector and a data path logic processing unit corresponding to each set of the signal transceiver units; the signal transmitting unit comprises a second front-stage conversion unit and a second back-stage conversion unit, a first output end of the signal receiving unit is connected to a first input end of the data selector, a second output end of the signal receiving unit is connected to an input end of the data path logic processing unit, an output end of the data path logic processing unit is connected to an input end of the second front-stage conversion unit, an output end of the second front-stage conversion unit is connected to a second input end of the data selector, and an output end of the data selector is connected to an input end of the second back-stage conversion unit. In a low latency mode, the first input end of the data selector is selected and a first parallel signal generated through serial-to-parallel conversion by the signal receiving unit is transmitted through the data selector to the second back-stage conversion unit for parallel-to-serial conversion. In a normal mode, the second input end of the data selector is selected, the signal receiving unit performs bit width conversion on the first parallel signal to obtain a second parallel signal, which is then processed by the data path logic processing unit and sent to the second front-stage conversion unit for bit width conversion to obtain a bit-width-converted second parallel signal, and the bit-width-converted second parallel signal is then transmitted through the data selector to the second back-stage conversion unit for parallel-to-serial conversion. The first parallel signal has a bit width smaller than that of the second parallel signal.

In an embodiment of the present disclosure, the data path logic processing unit comprises a first data path logic processing subunit corresponding to the signal receiving unit, and a second data path logic processing subunit corresponding to the signal transmitting unit. An input end of the first data path logic processing subunit serves as the input end of the data path logic processing unit, an output end of the first data path logic processing subunit is connected to an input end of the second data path logic processing subunit, and an output end of the second data path logic processing subunit serves as the output end of the data path logic processing unit.

In an embodiment of the present disclosure, a phase aligner is connected between the signal receiving unit and the first input end of the data selector, for aligning phases of a parallel signal input to the first input end of the data selector with a clock phase of the signal transmitting unit.

In an embodiment of the present disclosure, the signal receiving unit comprises a first front-stage conversion unit and a first back-stage conversion unit; an output end of the first front-stage conversion unit serves as the first output end of the signal receiving unit and is connected to the first input end of the data selector and an input end of the first back-stage conversion unit, respectively, wherein an output end of the first back-stage conversion unit serves as the second output end of the signal receiving unit and is connected to the input end of the data path logic processing unit. The first front-stage conversion unit is for performing serial-to-parallel conversion on a high-speed serial signal it receives, to generate the first parallel signal. The first back-stage conversion unit is for performing bit width conversion on the first parallel signal sent from the first front-stage conversion unit, to generate the second parallel signal.

In an embodiment of the present disclosure, the retimer further includes a bit width conversion unit, and the bit width conversion unit is connected between the first output end of the signal receiving unit and the first input end of the data selector and is for converting a bit width of the first parallel signal so that the bit width of the first parallel signal matches an input bit width of the second back-stage conversion unit.

In an embodiment of the present disclosure, for each set of the signal transceiver units, the signal receiving unit has a first signal pin, and the signal transmitting unit has a second signal pin, one of the first signal pin and the second signal pin is connected to a corresponding pin on the chip package, with the two connected pins located on the same side; and the other of the first signal pin and the second signal pin is connected to another pin on the chip package, with the two connected pins on opposite sides.

The present disclosure also provides a low latency control method applied to a retimer, wherein the retimer has a physical layer module on each of two opposite sides; each physical layer module includes at least one set of signal transceiver units including a signal receiving unit and a signal transmitting unit; the low latency control method includes: by the signal receiving unit, upon receiving a first high-speed serial signal, performing a serial-to-parallel conversion on the a first high-speed serial signal to generate a parallel signal and sending the parallel signal to the signal transmitting unit; and by the signal transmitting unit, performing a parallel-to-serial conversion on the parallel signal, converting the parallel signal to a second high-speed serial signal, and outputting the second high-speed serial signal.

In an embodiment of the present disclosure, the step of sending the parallel signal to the signal transmitting unit includes: in a low latency mode, sending the parallel signal to the signal transmitting unit; and in a normal mode, sending the parallel signal to a corresponding data path logic processing unit for processing and sending a processed parallel signal to the signal transmitting unit.

In an embodiment of the present disclosure, the parallel signal comprises a first parallel signal and a second parallel signal, wherein the step of sending the parallel signal to the signal transmitting unit includes: in a low latency mode, sending the first parallel signal to the signal transmitting unit, wherein the first parallel signal is generated through serial-to-parallel conversion by the signal receiving unit; and in a normal mode, sending the second parallel signal to a corresponding data path logic processing unit for processing, wherein the second parallel signal is generated through bit width conversion on the first parallel signal by the signal receiving unit, and sending the processed second parallel signal to the signal transmitting unit; wherein a bit width of the first parallel signal is less than that of the second parallel signal.

In an embodiment of the present disclosure, in the low latency mode, the sending the first parallel signal to the signal transmitting unit includes: converting a bit width of the first parallel signal so that it matches an input bit width of the signal transmitting unit, to obtain a bit-width-converted first parallel signal to the signal transmitting unit.

DETAILED DESCRIPTION

The following describes the implementation of the present disclosure through specific examples, and those skilled in the art can easily understand other advantages and effects of the present disclosure from the content disclosed in this specification. The present disclosure can also be implemented or applied through other different specific embodiments. Various details in this specification can also be modified or changed based on different viewpoints and applications without departing from the spirit of the present disclosure. It should be noted that the following embodiments and the features in the embodiments can be combined with each other if no conflict will result.

It should be noted that the drawings provided in this disclosure only illustrate the basic concept of the present disclosure in a schematic way, so the drawings only show the components related to the present disclosure. The drawings are not necessarily drawn according to the number, shape and size of the components in actual implementation; during the actual implementation, the type, quantity and proportion of each component can be changed as needed, and the components' layout can also be more complicated.

Figure 1:
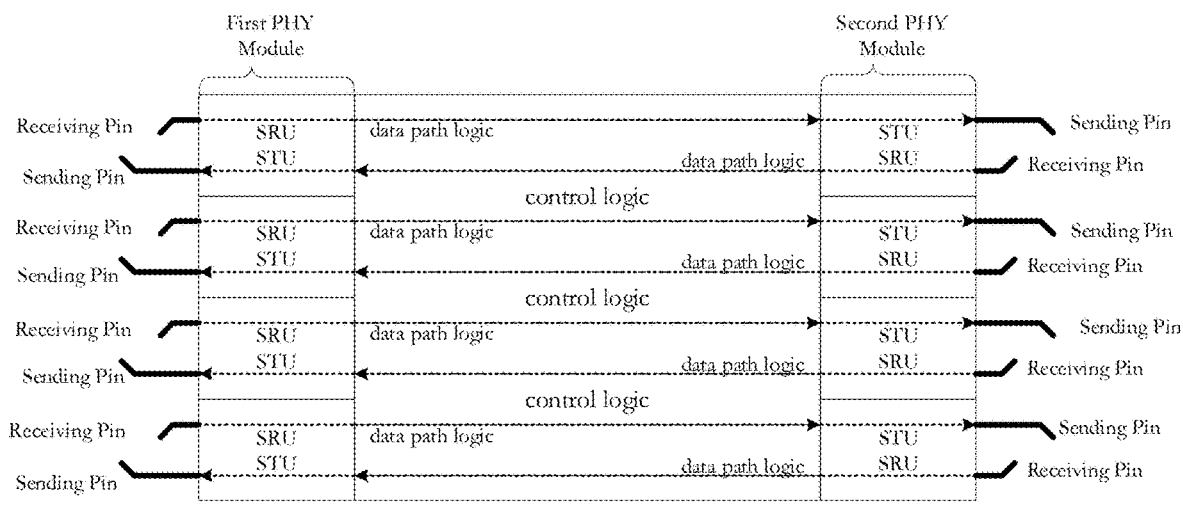
FIG. 1 shows a schematic diagram of data paths of a retimer in the prior art.

In a retimer, a data path logic processing unit corresponding to a signal receiving unit is responsible for decoding, descrambling, deskewing, etc., and a data path logic processing unit corresponding to a signal transmitting unit is responsible for modifying data, calculating check bits, scrambling, encoding, etc. Note that in some of the attached drawings, the signal receiving unit is labeled as SRU, and the signal transmitting unit is labeled as STU. In an existing retimer, linear data paths (as shown in FIG. 1) are adopted, which include receiving data path logics on a first physical layer module on one side of the retimer, and sending data path logics on a second physical layer module on the opposite side of the retimer. Data are first processed by the receiving data path logics, and then by the sending data path logics, and the data are finally sent out by a signal transmitting unit on the second physical layer module. The present disclosure provides a low latency retimer. The low latency retimer adopts loopback data paths, and includes receiving digital logics and sending digital logics on the same side. The data are processed by receiving digital logics on one side of the retimer, then processed by the sending digital logics on the same side of the retimer, and finally sent out by a signal transmitting unit in a physical layer on the same side as the digital logics.

Specifically, in the present disclosure, data paths are implemented by a signal transmitting unit and a corresponding signal receiving unit in the same physical layer module of the retimer, the data paths of the retimer form a loopback structure instead of linear structure in existing retimer. After routing serial signal of either the signal transmitting unit or the signal receiving unit to the opposite side of the retimer when the chip is being packaged, the pin arrangement of the present disclosure can also be compatible with the conventional scheme. The data paths of the retimer of the present disclosure form a loopback structure, and the signal transmitting unit and the signal receiving unit are physically adjacent to each other, therefore in a low latency mode of the retimer, the distance between the receiving end and the sending end is extremely short, thereby solving the problem of signal transmission delay over long distances, and also avoiding high power consumption caused by transmitting high-speed signals over long distances.

The low latency retimer of the present disclosure and a corresponding low latency control method are described in detail below.

The present disclosure provides a low latency retimer; a physical layer module is provided on each of two opposite sides of the retimer; each physical layer module includes at least one set of signal transceiver units, and each set of the signal transceiver units includes a signal receiving unit (SRU) and a signal transmitting unit (STU); the signal receiving unit performs a serial-to-parallel conversion on a first high-speed serial signal to generate a parallel signal, and sends the parallel signal to the signal transmitting unit of the same set of signal transceiver units; the signal transmitting unit performs a parallel-to-serial conversion on the parallel signal, to convert the parallel signal to obtain a second high-speed serial signal, and outputs the second high-speed serial signal.

Figure 2:
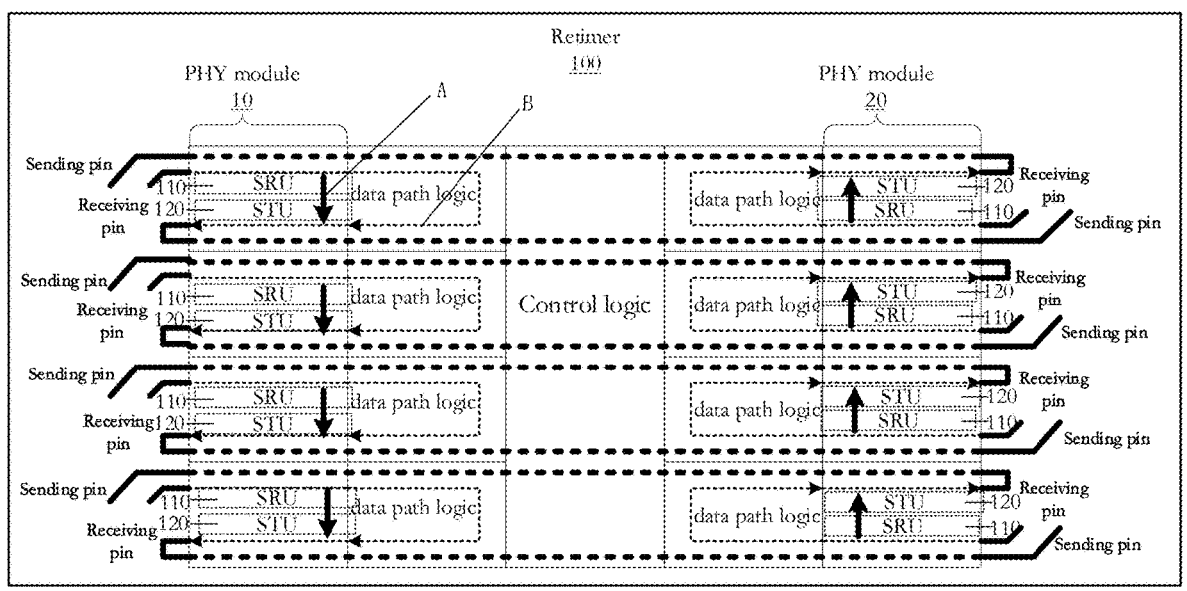
FIG. 2 shows a schematic diagram of a low latency retimer according to an embodiment of the present disclosure.

FIG. 2 shows a schematic diagram of a low latency retimer according to an embodiment of the present disclosure. As shown in FIG. 2, the low latency retimer 100 includes a physical layer (PHY) module 10 and a physical layer module 20 disposed on opposite sides of the retimer 100, respectively, with the physical layer modules 10 and 20 each having at least one set of signal transceiver units, wherein each set of the signal transceiver units includes a signal receiving unit 110 and a signal transmitting unit 120. Unless otherwise indicated, when "signal receiving unit 110" and "signal transmitting unit 120" are mentioned one after another, they herein refer to a signal receiving unit and a signal transmitting unit of the same set of signal transceiver units. For each set of the signal transceiver units, the signal receiving unit 110 and the signal transmitting unit 120 are adjacent to each other and correspond to each other, and one or more data paths are formed between them. The signal receiving unit 110 performs a serial-to-parallel conversion on a first high-speed serial signal to generate a parallel signal and to send the parallel signal to the corresponding signal transmitting unit 120. The signal transmitting unit 120 performs a parallel-to-serial conversion on the parallel signal to convert the parallel signal to a second high-speed serial signal, and output the second high-speed serial signal. As can be seen from above, the signal receiving unit 110 and the signal transmitting unit 120 of the same set are on the same physical layer module.

Specifically, a signal receiving unit 110 in a physical layer module (e.g., the physical layer module 10 as shown in FIG. 2) on one side of the retimer 100, when receiving a first high-speed serial signal, performs a serial-to-parallel conversion on the first high-speed serial signal to generate a parallel signal, and sends the parallel signal to a corresponding signal transmitting unit 120 located in the same physical layer module, and the signal transmitting unit 120 performs a parallel-to-serial conversion on the parallel signal, to convert the parallel signal into a second high-speed serial signal, and then outputs the second high-speed serial signal.

In one embodiment, two data paths exist between the signal receiving unit 110 and signal transmitting unit 120 of each set, and the two data paths are respectively a normal mode data path activated in a normal mode, and an ultra-low latency bypass path activated in a low latency mode. As shown in FIG. 2, the parallel signal obtained by a signal receiving unit 110 can be sent to a corresponding signal transmitting unit 120 via the normal mode data path (the data link indicated by a thin dashed line B with an arrow in FIG. 2) or the ultra-low latency bypass path (the data link indicated by a thick line A with an arrow in FIG. 2).

A data selector (not shown in FIG. 2) and a data path logic(s) (also called a data path logic processing unit) are connected between the signal receiving unit 110 and the signal transmitting unit 120 of the same set, respectively. In the normal mode, the parallel signal obtained by the serial-to-parallel conversion process of the signal receiving unit 110 is processed by the data path logic unit, and then transmitted to the corresponding signal transmitting unit 120. In the low latency mode, the parallel signal generated by the signal receiving unit 110 through serial-to-parallel conversion is transmitted to the signal transmitting unit 120 via the data selector.

During chip packaging, signal pins on the die are routed to pins on the chip package for external connection using metal wires. The package has no logic function and only realizes connection of signals. Therefore, the retimer 100 of the present disclosure adopts metal wires to connect signal pins of the signal receiving unit 110 and signal transmitting unit 120 of the same set, which are on the same physical layer module, to corresponding pins on two sides of the chip package during packaging, so that the pin arrangement of the present disclosure can be compatible with the conventional scheme.

As shown below, the chip package of the retimer of the present disclosure is described by comparing with the chip package of existing retimers.

Figure 3:
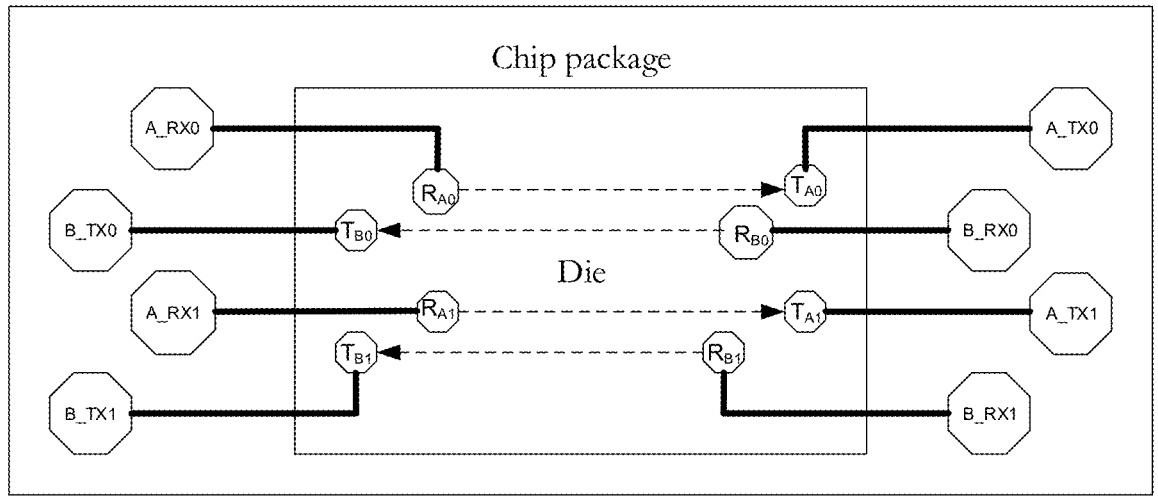
FIG. 3 shows a schematic diagram of a chip package of a retimer in the prior art.

FIG. 3 shows a schematic diagram of a chip package of a retimer in the prior art. As shown in FIG. 3, in the chip package of the existing retimer, A_RX0, B_RX0, A_RX1, and B_RX1 are receiving pins of the chip package of the retimer, A_TX0, B_TX0, B_TX1, and A_TX1 are sending pins of the chip package of the retimer. RA0, RB0, RA1, RB1 are receiving pins on the die, and TA0, TB0, TA1, TB1 are sending pins on the die. Referring to FIG. 3, the retimer package has linear data paths. For example, the receiving pin A_RX0 on a first side of the chip package is connected to the receiving pin RA0 on a first side of the die, and the sending pin A_TX0 located on a second side of the chip package is connected to the sending pin TA0 on a second side of the die, forming a linear data path. Herein, the first sides are opposite to the second sides.

Figure 4:
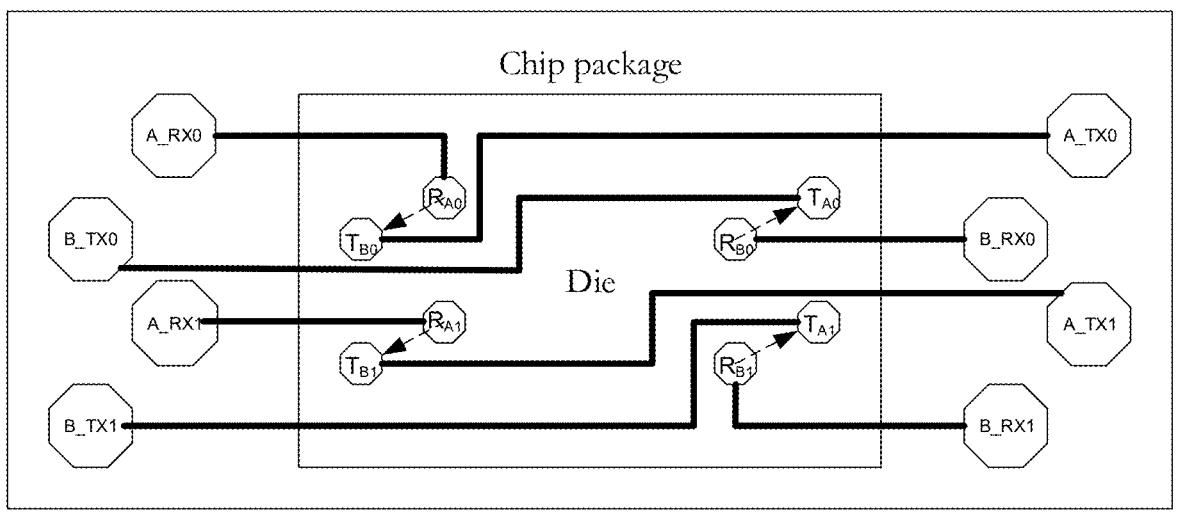
FIG. 4 shows a schematic diagram of a chip package of a low latency retimer according to an embodiment of the present disclosure.

As shown in FIG. 4, in some embodiments of the present disclosure, for each set of signal transceiver units that include a signal receiving unit 110 and a signal transmitting unit 120, which may be located on a physical layer module on either side of the retimer, the signal receiving unit 110 has a receiving pin, and the signal transmitting unit 120 has a sending pin, and if the receiving pin of the signal receiving unit 110 is connected to a receiving pin located on a first side of the chip package, the sending pin of the signal transmitting unit 120 is connected, via package substrate routing, to a corresponding sending pin located on a second side of the chip package opposite to the first side of the chip package, wherein the physical layer of the retimer is opposite to the second side of the chip package.

FIG. 4 shows a schematic diagram of a chip package of a retimer 100 according to an embodiment of the present disclosure. A_RX0, B_RX0, A_RX1, B_RX1 shown in FIG. 4 are receiving pins of the chip package of the retimer 100, A_TX0, B_TX0, B_TX1, A_TX1 are sending pins of the chip package of the retimer 100, RA0, RB0, RA1, RB1 are receiving pins on the die, and TA0, TB0, TA1, TB1 are sending pins on the die.

As shown in FIG. 4, the receiving pin RA0 on the die is connected to the receiving pin A_RX0 of the chip package, and both pins are on the same side. Meanwhile, the sending pin TB0 on the die, corresponding to the receiving pin RA0, is connected to the sending pin A_TX0 of the chip package through package substrate routing external to the die, forming a loopback data path. Note that the sending pin TB0 and the sending pin A_TX0 are located on opposite sides.

Figure 5:
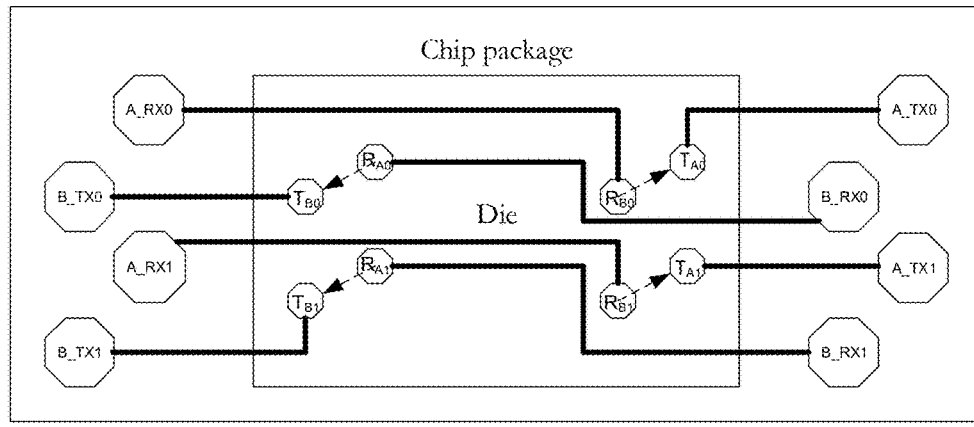
FIG. 5 shows a schematic diagram of a chip package of a low latency retimer according to another embodiment of the present disclosure.

Similarly, as shown in FIG. 5, in some embodiments, for each set of signal transceiver units that include a signal receiving unit 110 and a signal transmitting unit 120, which may be located on a physical layer module on either side of the retimer, the signal receiving unit 110 has a receiving pin, and the signal transmitting unit 120 has a sending pin, and if the receiving pin of the signal receiving unit 110 is connected, via a package substrate routing, to a receiving pin located on a first side of the chip package, the sending pin of the signal transmitting unit 120 is connected to a corresponding sending pin located on a second side of the chip package opposite to the first side of the chip package, wherein the physical layer module is opposite to the first side of the chip package.

FIG. 5 shows a schematic diagram of an alternative chip package of the retimer 100 according to an embodiment of the present disclosure. A_RX0, B_RX0, A_RX1, B_RX1 shown in FIG. 5 are receiving pins of the chip package of the retimer 100, A_TX0, B_TX0, B_TX1, A_TX1 are sending pins of the chip package of the retimer 100, RA0, RB0, RA1, RB1 are receiving pins on the die, and TA0, TB0, TA1, TB1 are sending pins on the die. As shown in FIG. 5, the receiving pin A_RX0 of the chip package is connected to the receiving pin RB0 on the die through a package substrate routing external to the die, with the two pins on opposite sides. The sending pin TA0, corresponding to the receiving pin RB0, is connected to the sending pin A_TX0 of the chip package, where the sending pin TA0 and the sending pin A_TX0 are on the same side, and as a result, a loopback data path is formed.

In an embodiment of the present disclosure, for each set of the signal transceiver units, the signal receiving unit 110 has a first signal pin, and the signal transmitting unit 120 has a second signal pin, one of the first signal pin and the second signal pin is connected to a corresponding pin on the chip package, with the two connected pins located on the same side; and the other of the first signal pin and the second signal pin is connected to another pin on the chip package, with the two connected pins on opposite sides. The present disclosure uses chip package traces to route serial signals generated by either the signal receiving unit 110 or the signal transmitting unit 120 in the physical layer module on a first side of the retimer, to a second side of the retimer opposite to the first side, keeping pins of the chip package compatible with the conventional scheme, and at the same time achieving loopback data paths instead of linear data paths. The signal transmitting unit 120 and signal receiving unit 110 corresponding to each loopback data path are next to each other, so that a straight-through signal can be delivered with a very short wiring distance in the low latency mode of the retimer 100, which greatly reduces the signal latency of the retimer 100.

There are various ways to form a data path between the signal receiving unit 110 and the signal transmitting unit 120 of the same set, and three of them are described below.

Figure 6:
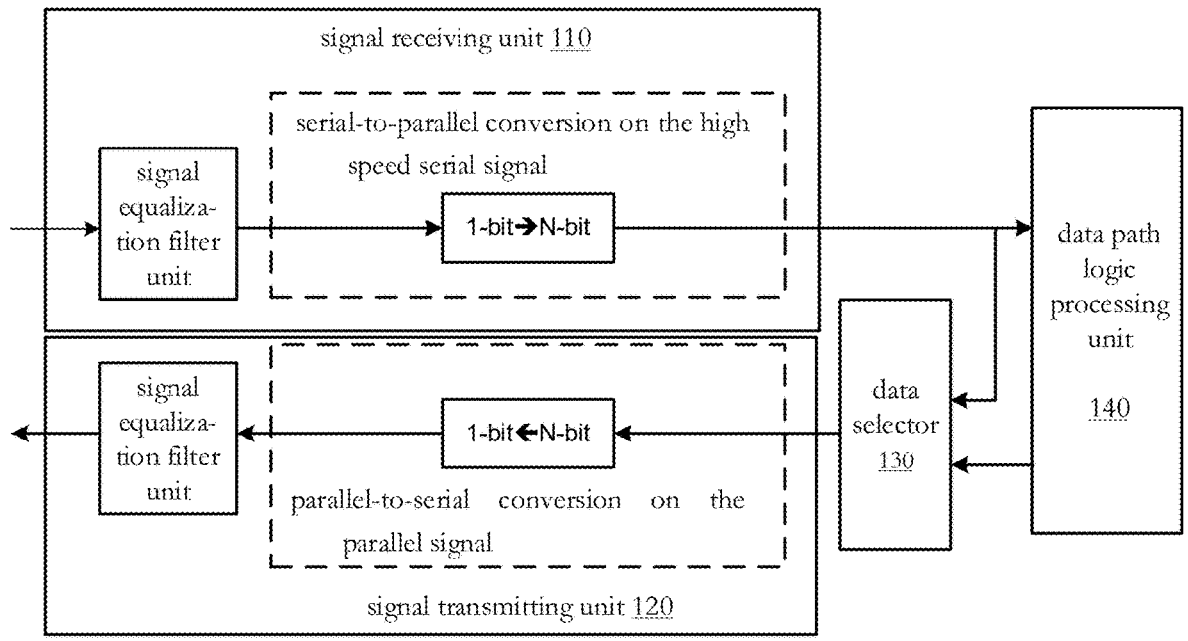
FIG. 6 shows a schematic diagram of data paths of a signal receiving unit and a corresponding signal transmitting unit in a physical layer module on one side of a low latency retimer according to an embodiment of the present disclosure.

FIG. 6 shows a schematic diagram of data paths of a signal receiving unit and a corresponding signal transmitting unit in a physical layer module on one side of a low latency retimer according to an embodiment of the present disclosure.

As shown in FIG. 6, the low latency retimer 110 further includes a data selector 130 and a data path logic processing unit 140 corresponding to each set of the signal transceiver units; an output end of the signal receiving unit 110 is connected to a first input end of the data selector 130 and to an input end of the data path logic processing unit 140, respectively; an output end of the data path logic processing unit 140 is connected to a second input end of the data selector 130; an output end of the data selector 130 is connected to an input end of the signal transmitting unit 120.

Specifically, in the low latency mode, the first input end of the data selector 130 is selected and the parallel signal generated by the signal receiving unit 110 after the serial-parallel conversion process is sent directly to the signal transmitting unit 120 through the data selector 130, thus forming a straight-through path without going through the data path logic processing unit 140, i.e., forming an ultra-low latency bypass path. In addition, in some embodiments, the straight-through path can also skip some serial-parallel conversion logics, as in the scheme shown in FIGS. 7 and 8. In the normal mode, the second input end of the data selector 130 is selected, and the parallel signal generated by the signal receiving unit 110 after series-parallel conversion is processed by the data path logic processing unit 140 and then sent to the signal transmitting unit 120 through the data selector 130, thus forming a normal-mode data path via the data path logic processing unit 140. In the low latency mode, the signal transmitting unit 120 and the signal receiving unit 110 are adjacent to each other, so the straight-through path does not go through the data path logic processing unit and skips most of the serial-to-parallel conversion logics, resulting in low line delay and low data buffer delay, thus enabling a low-latency straight-through path.

In some embodiments, the data path logic processing unit 140 includes a first data path logic processing subunit corresponding to the signal receiving unit 110 and a second data path logic processing subunit corresponding to the signal transmitting unit 120. An input end of the first data path logic processing subunit serves as the input end of the data path logic processing unit 140, an output end of the first data path logic processing subunit is connected to an input end of the second data path logic processing subunit, and an output end of the second data path logic processing subunit serves as the output end of the data path logic processing unit 140. The parallel signal output by the signal receiving unit 110 is first processed by the first data path logic processing subunit and the second data path logic processing subunit, and then output.

In some embodiments, the signal receiving unit 110 further includes a signal equalization filter unit for equalizing and filtering the high-speed serial signal received by the signal receiving unit 110, and the signal transmitting unit 120 further includes a signal equalization filter unit for equalizing and filtering the serial signal obtained through parallel-to-serial conversion performed by the signal transmitting unit 120.

Figure 7:
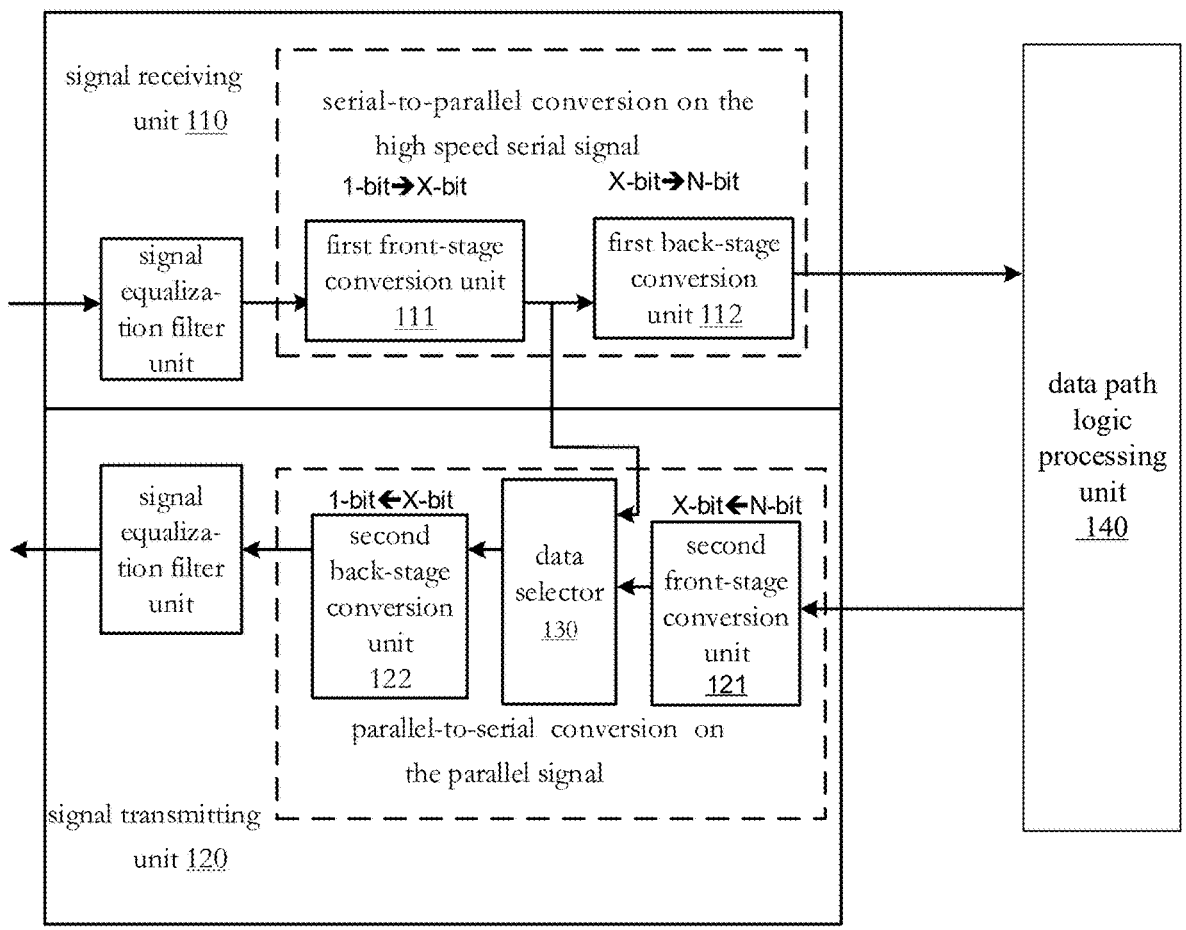
FIG. 7 shows a schematic diagram of data paths of a signal receiving unit and a corresponding signal transmitting unit in a physical layer module on one side of a low latency retimer according to another embodiment of the present disclosure.

FIG. 7 shows a schematic diagram of data paths of a signal receiving unit 110 and a corresponding signal transmitting unit 120 in a physical layer module on one side of a low latency retimer 100 according to another embodiment of the present disclosure. In one embodiment, as shown in FIG. 7, a data selector 130 and a data path processing logic unit 140 are respectively connected between the signal receiving unit 110 and the signal transmitting unit 120. In one embodiment, the signal receiving unit 110 includes a first front-stage conversion unit 111 and a first back-stage conversion unit 112. An output end of the first front-stage conversion unit 111 serves as the first output end of the signal receiving unit 110, and is connected to the first input end of the data selector 130 and an input end of the first back-stage conversion unit 112, respectively; and the first front-stage conversion unit 111 performs a serial-to-parallel conversion on the high-speed serial signal it received to generate a first parallel signal, wherein the bit width of the signal is converted from 1 bit to X bits, for example. The first back-stage conversion unit 112 is for performing bit width conversion on the first parallel signal received from the first front-stage conversion unit 111, to generate a second parallel signal, for example, the bit width of the signal is converted from X bits to N bits, 1<X<N, and the first parallel signal has a bit width smaller than that of the second parallel signal.

In an embodiment, the signal transmitting unit 120 comprises a second front-stage conversion unit 121 and a second back-stage conversion unit 122. An output end of the first back-stage conversion unit 112 acts as the second output end of the signal receiving unit 110, and is connected to the input end of the second front-stage conversion unit 121 via a data path logic processing unit 140; the data path logic processing unit 140 is for logical processing of the second parallel signal. The second front-stage conversion unit 121 performs bit width conversion on the second parallel signal processed by the data path logic processing unit 140. The second back-stage conversion unit 122 performs a parallel-to-serial conversion on either the first parallel signal from the first front-stage conversion unit or the second parallel signal from the second front-stage conversion unit.

In one embodiment, as shown in FIG. 7, the data selector 130 is placed in the signal transmitting unit 120. In some other embodiments, the selector 130 may also be provided outside of the signal receiving unit 110 and the signal transmitting unit 120, between the signal receiving unit 110 and the signal transmitting unit 120, or in the signal receiving unit 110.

Specifically, in the low latency mode, the first input end of the data selector 130 is selected, and a first parallel signal with a bit width of X bits is generated after serial-to-parallel conversion by the first front-stage conversion unit 111, and the first parallel signal is input to the first input end of the data selector 130 and transmitted through the data selector 130 to the second back-stage conversion unit 122 of the signal transmitting unit 120 for parallel-to-serial conversion, to generate a high-speed serial signal. In a normal mode, the second input end of the data selector 130 is selected and the first parallel signal with a bit width of X bits generated by the first front-stage conversion unit 111 after serial-to-parallel conversion is input to the first back-stage conversion unit 112 for bit width conversion to generate a second parallel signal with a bit width of N bits, and the second parallel signal is logically processed by the data path logic processing unit 140 and sent to the second front-stage conversion unit 121 for bit width conversion, generating a parallel signal with a bit width of X bits, which is input to the second input end of the data selector 130 and transmitted through the data selector 130 to the second back-stage conversion unit 122 for parallel-to-serial conversion to generate a high speed serial signal.

In some embodiments, the data path logic processing unit 140 includes a first data path logic processing subunit corresponding to the signal receiving unit 110 and a second data path logic processing subunit corresponding to the signal transmitting unit 120. The signal receiving unit 110 is connected to the signal transmitting unit 120 via the first data path logic processing subunit and the second data path logic processing subunit.

In FIG. 7, an output bit width of the first front-stage conversion unit 111 matches an input bit width of the second back-stage conversion unit 122, the first front-stage conversion unit 111 converts a serial signal into a signal with a bit width of X bits, and accordingly, the second back-stage conversion unit 122 converts the signal with a bit width of X bits into a serial signal; an output bit width of the first back-stage conversion unit 112 matches an input bit width of the second front-stage conversion unit 121, the first back-stage conversion unit 112 converts the signal with a bit width of X bits to a signal with a bit width of N bits, and accordingly, the second front-stage conversion unit 121 converts the signal with a bit width of N bits to a signal with a bit width of X bits.

However, in some embodiments, the output bit width of the first front-stage conversion unit 111 does not match the input bit width of the second back-stage conversion unit 122, and the output bit width of the first back-stage conversion unit 112 does not match the input bit width of the second front-stage conversion unit.

Figure 8:
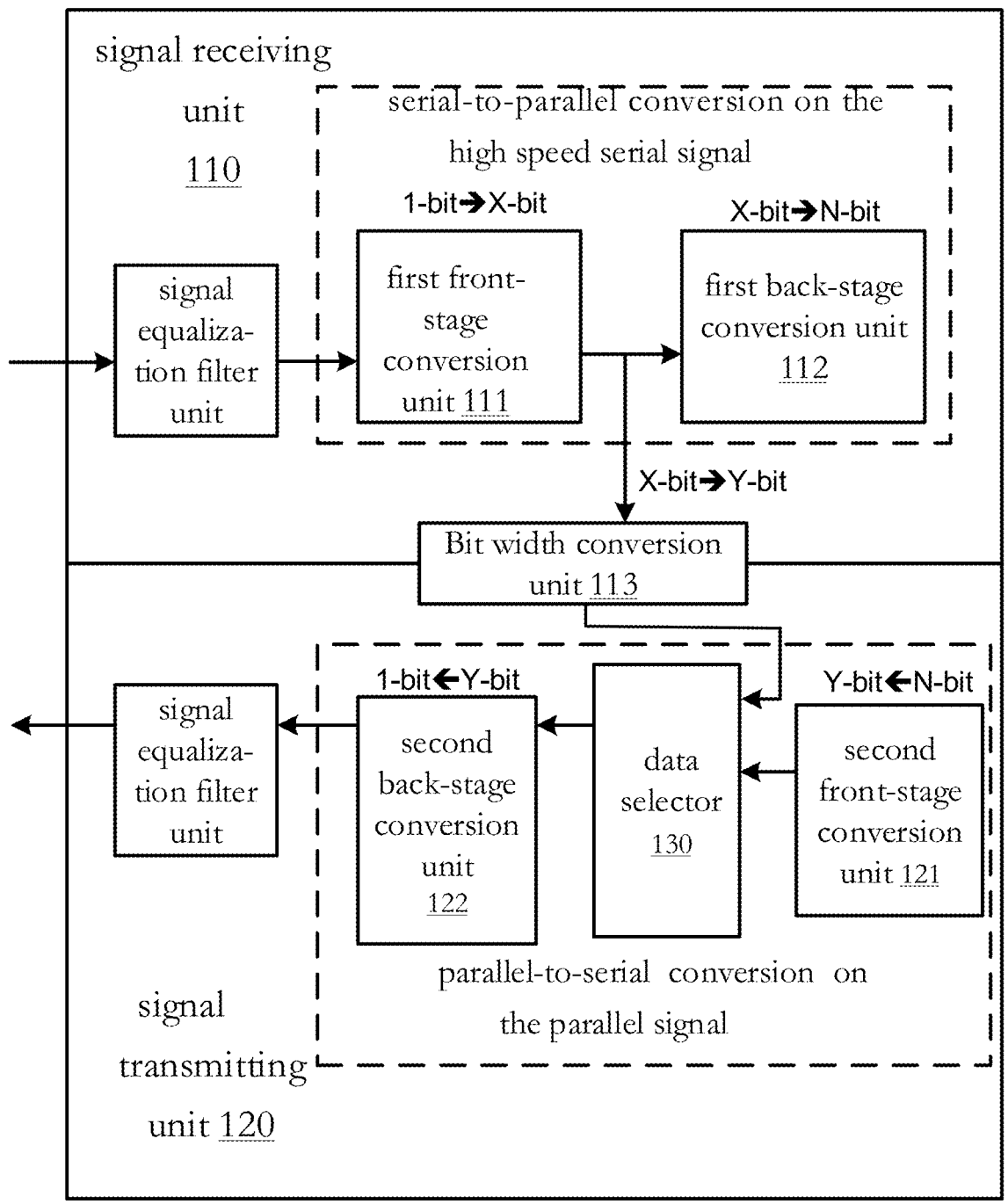
FIG. 8 shows a schematic diagram of data paths of a signal receiving unit and a corresponding signal transmitting unit in a physical layer module on one side of a low latency retimer according to an embodiment of the present disclosure.

For example, FIG. 8 illustrates a mismatch between the output bit width of the first front-stage conversion unit 111 and the input bit width of the second back-stage conversion unit 122, wherein the first front-stage conversion unit 111 converts a serial signal to a signal with a bit width of X bits, while the second back-stage conversion unit 122 converts a signal with a bit width of Y bits to a serial signal.

In view of the mismatch, as shown in FIG. 8, the retimer 100 further includes a bit width conversion unit 113, the bit width conversion unit 113 is connected between the first output end of the signal receiving unit 110 and the first input end of the data selector 130, for converting the bit width of the first parallel signal to match the input bit width of the second back-stage conversion unit 122. In some embodiments, a phase aligner is connected between the first input end of the data selector 130 and the signal receiving unit 110, for aligning the phase of the parallel signal input to the data selector 130 with a clock phase of the signal transmitting unit 120.

As illustrated in FIGS. 7 and 8, a straight-through path in a low latency mode is realized, using high-speed logic circuitry inside the physical layer module, skipping most of the serial-parallel and parallel-to-serial conversion logics, thereby further reducing signal delays.

The present disclosure further provides a low latency control method applied to the retimer 100. A physical layer module is provided on each of two opposite sides of the retimer 100, wherein each physical layer module includes at least one set of signal transceiver units, and each set of the signal transceiver units includes a signal receiving unit 110 and a signal transmitting unit 120 (see FIG. 2). The low latency control method includes:

Step 1: When the signal receiving unit 110 receives a first high-speed serial signal, performing a serial-to-parallel conversion on the first high-speed serial signal to generate a parallel signal, and sending the parallel signal to the corresponding signal transmitting unit 120.

Step 2: By the signal transmitting unit 120, performing a parallel-to-serial conversion on the parallel signal, converting the parallel signal to a second high-speed serial signal, and outputting the second high-speed serial signal.

In an embodiment, step 1 further includes: in a low latency mode, sending the parallel signal to the signal transmitting unit; and in a normal mode, sending the parallel signal to a corresponding data path logic processing unit for processing and sending processed parallel signal to the signal transmitting unit.

As shown in FIG. 6, in a low latency mode, the first input end of the data selector is selected and the parallel signal generated by the signal receiving unit is sent to the signal transmitting unit through the data selector. In a normal mode, the second input end of the data selector is selected and the parallel signal generated by the signal receiving unit is processed by the corresponding data path logic processing unit and transmitted through the data selector to the signal transmitting unit.

In another embodiment, step 1 further includes: in a low latency mode, sending the first parallel signal to the signal transmitting unit, wherein the first parallel signal is generated through serial-to-parallel conversion by the signal receiving unit; and in a normal mode, sending a second parallel signal to a corresponding data path logic processing unit for processing, wherein the second parallel signal is generated through bit width conversion on the first parallel signal by the signal receiving unit, and sending the processed second parallel signal to the signal transmitting unit; wherein a bit width of the first parallel signal is less than that of the second parallel signal.

As shown in FIG. 7, in the low latency mode, the first input end of the data selector 130 is selected, and the first front-stage conversion unit 111 of the signal receiving unit 110 performs a serial-to-parallel conversion on the high-speed serial signal it received to generate a first parallel signal, and sends the first parallel signal through the data selector 130 to the second back-stage conversion unit 122 of the signal transmitting unit 120; in the normal mode, the first back-stage conversion unit 112 of the signal receiving unit 110 performs a bit width conversion on the first parallel signal generated through serial-to-parallel conversion by the first front-stage conversion unit 111, to generate a second parallel signal, and the second parallel signal is processed by the data path logic processing unit 140 and sent to the second front-stage conversion unit 121 of the signal transmitting unit 120 for bit width conversion, and the bit-width-converted second parallel signal is sent to the second back-stage conversion unit 122 through the data selector 130.

In FIG. 7, the output bit width of the first front-stage conversion unit 111 matches the input bit width of the second back-stage conversion unit 122, the first front-stage conversion unit 111 converts the serial signal into a signal with a bit width of X bits, and accordingly, the second back-stage conversion unit 122 converts the signal with a bit width of X bits into a serial signal; the output bit width of the first back-stage conversion unit 112 matches an input bit width of the second front-stage conversion unit 121, the first back-stage conversion unit 112 converts the signal with a bit width of X bits to a signal with a bit width of N bits, and accordingly, the second front-stage conversion unit 121 converts the signal with a bit width of N bits to a signal with a bit width of X bits.

However, in some embodiments, the output bit width of the first front-stage conversion unit 111 does not match the input bit width of the second back-stage conversion unit 122, and the output bit width of the first back-stage conversion unit 112 does not match the input bit width of the second front-stage conversion unit 121.

For example, FIG. 8 illustrates a mismatch between the output bit width of the first front-stage conversion unit 111 and the input bit width of the second back-stage conversion unit 122, wherein the first front-stage conversion unit 111 converts a serial signal to a signal with a bit width of X bits, while the second back-stage conversion unit 122 converts a signal with a bit width of Y bits to a serial signal.

In view of the mismatch, the step of sending the first parallel signal generated through serial-to-parallel conversion by the signal receiving unit to the signal transmitting unit further includes: converting a bit width of the first parallel signal so that it matches an input bit width of the signal transmitting unit, and sending the bit-width-converted first parallel signal to the signal transmitting unit.

As shown in FIG. 8, a bit width conversion unit 113 is provided between the first front-stage conversion unit 111 and the data selector 130 for bit width conversion of the first parallel signal generated by the first front-stage conversion unit 111 to match the input bit width of the second back-stage conversion unit 122.

In summary, since each signal transmitting unit and the corresponding signal receiving unit are on the same physical layer module for data paths, data paths of the retimer form a loopback structure instead of linear structure, and after routing serial signals of either the signal transmitting unit or the signal receiving unit to the opposite side of the retimer when the chip is being packaged, the pin arrangement of the present disclosure can also be compatible with the conventional scheme. Since the data paths of the retimer in the present disclosure are loopback data paths, and the signal transmitting unit and the signal receiving unit are physically adjacent to each other, therefore in a low latency mode of the retimer, the distance between the receiving end and the sending end is extremely short, thereby solving the problem of signal transmission delay over long distances between the signal transmitting unit and the signal receiving unit, and also avoiding high power consumption caused by transmitting high-speed signals over long distances. Therefore, the present disclosure effectively overcomes shortcomings in the prior art and has a high industrial value.

The above embodiments are only illustrative of the principles of the present disclosure and its effectiveness, and are not intended to limit the scope of the present disclosure. Any person skilled in the art may modify or change the above embodiments without violating the spirit and scope of the present disclosure. Therefore, all equivalent modifications or changes made by a person having ordinary knowledge in the art, without departing from the spirit and technical ideas disclosed in the present disclosure, shall still be covered by the attached claims of the present disclosure.

What is claimed is:

1. A low latency retimer, comprising two physical layer modules, wherein the physical layer modules comprise a first physical layer module is provided on a first side of a chip package of the retimer, and a second physical layer module provided on a second side of the chip package opposite to the first side, wherein each physical layer module comprises at least one set of signal transceiver units, wherein each set of the signal transceiver units comprises a signal receiving unit and a signal transmitting unit; for each set of the signal transceiver units:
   the signal receiving unit performs a serial-to-parallel conversion on a first high-speed serial signal to generate a parallel signal and to send the parallel signal to the signal transmitting unit, and
   the signal transmitting unit performs a parallel-to-serial conversion on the parallel signal to convert the parallel signal into a second high-speed serial signal, and output the second high-speed serial signal;
   for each set of the signal transceiver units on the first side of chip package, the signal receiving unit has a first signal pin, and the signal transmitting unit has a second signal pin, one of the first signal pin and the second signal pin is connected to a first chip package pin on the first side of the chip package, and the other of the first signal pin and the second signal pin is connected to a second chip package pin on the second side of the chip package.

2. The low latency retimer according to claim 1, further comprising a data selector and a data path logic processing unit corresponding to each set of the signal transceiver units; for each set of the signal transceiver units:
   an output end of the signal receiving unit is connected to a first input end of the data selector and to an input end of the data path logic processing unit, respectively; an output end of the data path logic processing unit is connected to a second input end of the data selector, and an output end of the data selector is connected to an input end of the signal transmitting unit;
   wherein, in a low latency mode, the first input end of the data selector is selected and the parallel signal generated by the signal receiving unit is sent to the signal transmitting unit through the data selector;
   wherein, in a normal mode, the second input end of the data selector is selected and the parallel signal generated by the signal receiving unit is processed by the data path logic processing unit and transmitted through the data selector to the signal transmitting unit.

3. The low latency retimer according to claim 2, wherein the data path logic processing unit comprises a first data path logic processing subunit corresponding to the signal receiving unit, and a second data path logic processing subunit corresponding to the signal transmitting unit;
   wherein an input end of the first data path logic processing subunit serves as the input end of the data path logic processing unit, an output end of the first data path logic processing subunit is connected to an input end of the second data path logic processing subunit, and an output end of the second data path logic processing subunit serves as the output end of the data path logic processing unit.

4. The low latency retimer according to claim 2, wherein a phase aligner is connected between the signal receiving unit and the first input end of the data selector for aligning phases of the parallel signal input to the first input end of the data selector with a clock phase of the signal transmitting unit.

5. The low latency retimer according to claim 1, further comprising a data selector and a data path logic processing unit corresponding to each set of the signal transceiver units; for each set of the signal transceiver units:
   the signal transmitting unit comprises a second front-stage conversion unit and a second back-stage conversion unit, a first output end of the signal receiving unit is connected to a first input end of the data selector, a second output end of the signal receiving unit is connected to an input end of the data path logic processing unit, an output end of the data path logic processing unit is connected to an input end of the second front-stage conversion unit, an output end of the second front-stage conversion unit is connected to a second input end of the data selector, and an output end of the data selector is connected to an input end of the second back-stage conversion unit;
   wherein, in a low latency mode, the first input end of the data selector is selected and a first parallel signal generated through serial-to-parallel conversion by the signal receiving unit is transmitted through the data selector to the second back-stage conversion unit for parallel-to-serial conversion;
   wherein, in a normal mode, the second input end of the data selector is selected, the signal receiving unit performs bit width conversion on the first parallel signal to obtain a second parallel signal, which is then processed by the data path logic processing unit and transmitted to the second front-stage conversion unit for bit width conversion to obtain a bit-width-converted second parallel signal, and the bit-width-converted second parallel signal is then transmitted through the data selector to the second back-stage conversion unit for parallel-to-serial conversion;

wherein the first parallel signal has a bit width smaller than that of the second parallel signal.

6. The low latency retimer according to claim 5, wherein the signal receiving unit comprises a first front-stage conversion unit and a first back-stage conversion unit; an output end of the first front-stage conversion unit serves as the first output end of the signal receiving unit and is connected to the first input end of the data selector and an input end of the first back-stage conversion unit, respectively, wherein an output end of the first back-stage conversion unit serves as the second output end of the signal receiving unit and is connected to the input end of the data path logic processing unit;

wherein the first front-stage conversion unit is for performing serial-to-parallel conversion on the a first high-speed serial signal it receives, to generate the first parallel signal; the first back-stage conversion unit is for performing bit width conversion on the first parallel signal sent from the first front-stage conversion unit, to generate the second parallel signal.

7. The low latency retimer according to claim 5, further comprising a bit width conversion unit, wherein the bit width conversion unit is connected between the first output end of the signal receiving unit and the first input end of the data selector and is for converting a bit width of the first parallel signal so that the bit width of the first parallel signal matches an input bit width of the second back-stage conversion unit.

8. A low latency control method, wherein, the method is applied to a retimer, the retimer comprises two physical layer modules comprising a first physical layer module on a first side of a chip package of the retimer, and a second physical layer module provided on a second side of the chip package opposite to the first side, each physical layer module comprises at least one set of signal transceiver units comprising a signal receiving unit and a signal transmitting unit; wherein for each set of the signal transceiver units on the first side of chip package, the signal receiving unit has a first signal pin, and the signal transmitting unit has a second signal pin, one of the first signal pin and the second signal pin is connected to a first chip package pin on the first side of the chip package, and the other of the first signal pin and the second signal pin is connected to a second chip package pin on the second side of the chip package; wherein for each set of the signal transceiver units, the low latency control method comprises:

by the signal receiving unit, upon receiving a first high-speed serial signal, performing a serial-to-parallel conversion on the first high-speed serial signal to generate a parallel signal and sending the parallel signal to the signal transmitting unit; and by the signal transmitting unit, performing a parallel-to-serial conversion on the parallel signal, converting the parallel signal to a second high-speed serial signal, and outputting the second high-speed serial signal.

9. The low latency control method according to claim 8, wherein the step of sending the parallel signal to the signal transmitting unit comprises:

in a low latency mode, sending the parallel signal to the signal transmitting unit; and in a normal mode, sending the parallel signal to a corresponding data path logic processing unit for processing and sending the processed parallel signal to the signal transmitting unit.

10. The low latency control method according to claim 8, wherein the parallel signal comprises a first parallel signal and a second parallel signal, wherein the step of sending the parallel signal to the signal transmitting unit comprises:

in a low latency mode, sending the first parallel signal to the signal transmitting unit, wherein the first parallel signal is generated through serial-to-parallel conversion by the signal receiving unit; and in a normal mode, sending the second parallel signal to a corresponding data path logic processing unit for processing, wherein the second parallel signal is generated through bit width conversion on the first parallel signal by the signal receiving unit, and sending the processed second parallel signal to the signal transmitting unit;

wherein a bit width of the first parallel signal is less than that of the second parallel signal.

11. The low latency control method according to claim 10, wherein in the low latency mode, the sending the first parallel signal to the signal transmitting unit comprises:

converting a bit width of the first parallel signal so that the bit width of the first parallel signal matches an input bit width of the signal transmitting unit, and sending the obtained bit-width-converted first parallel signal to the signal transmitting unit.

\* \* \* \* \*